United States Patent
Stamm et al.

(10) Patent No.: US 7,978,485 B2
(45) Date of Patent: Jul. 12, 2011

(54) THYRISTOR POWER CONTROL CIRCUIT WITH DAMPING CIRCUIT MAINTAINING THYRISTOR HOLDING CURRENT

(75) Inventors: Thomas Stamm, Chicago, IL (US);
Vipin Bothra, Schaumburg, IL (US);
Vee Shing Wong, Schaumburg, IL (US)

(73) Assignee: STMicroelectronics, Inc., Coppell, TX (US)

( * ) Notice: Subject to any disclaimer, the term of this patent is extended or adjusted under 35 U.S.C. 154(b) by 567 days.

(21) Appl. No.: 12/114,618

(22) Filed: May 2, 2008

(65) Prior Publication Data

US 2009/0122580 A1    May 14, 2009

Related U.S. Application Data

(60) Provisional application No. 60/927,687, filed on May 4, 2007.

(51) Int. Cl.
*H02M 1/14* (2006.01)
(52) U.S. Cl. ............................................ 363/44; 363/86
(58) Field of Classification Search .................... 363/44, 363/86
See application file for complete search history.

(56) References Cited

U.S. PATENT DOCUMENTS

| | | | | |
|---|---|---|---|---|
| 3,270,270 A | * | 8/1966 | Yenisey | 363/86 |
| 3,470,444 A | * | 9/1969 | Bixby | 363/86 |
| 4,051,425 A | * | 9/1977 | Smith | 363/86 |
| 4,316,125 A | * | 2/1982 | Noguchi | 315/241 R |
| 4,321,662 A | * | 3/1982 | Yokoyama | 363/86 |
| 4,368,419 A | * | 1/1983 | Welty | 323/239 |
| 4,665,476 A | * | 5/1987 | Masuda | 96/25 |
| 4,733,102 A | * | 3/1988 | Nakayama et al. | 307/107 |
| 4,959,766 A | * | 9/1990 | Jain | 363/48 |
| 5,027,039 A | * | 6/1991 | Matsui et al. | 315/241 P |
| 5,192,896 A | * | 3/1993 | Qin | 315/224 |
| 5,515,262 A | * | 5/1996 | Johnston et al. | 363/90 |
| 5,812,386 A | * | 9/1998 | Youn | 363/86 |
| 6,269,012 B1 | * | 7/2001 | Kusakabe et al. | 363/84 |
| 2009/0122580 A1 | * | 5/2009 | Stamm et al. | 363/44 |

OTHER PUBLICATIONS

Stmicroelectronics; "Cooper 62W PFC Dimmable 5 output"; Apr. 30, 2007; p. 1.
"NXP AC/DC Converter for LED Luminaires"; Jan. 28 2008; 2 Pages.
Green, Peter; "IRPLCFL3: A Ballast that can be Dimmed from a Domestic (Phase Cut) Dimmer"; International Rectifier; pp. 1-12; Aug. 25, 2003.
Power Integrations; "Design Example Report—75 W Single Output, Power-Factor Corrected LED Driver Using TOP250YN"; Apr. 1, 2008; pp. 1-36.

* cited by examiner

*Primary Examiner* — Jeffrey L Sterrett
(74) *Attorney, Agent, or Firm* — Lisa K. Jorgenson; Andre M. Szuwalski

(57) ABSTRACT

A thyristor power control circuit reduces EMI and maintains a holding current in the thyristor to prevent flickering at a load. The power control circuit includes a thyristor configured to receive an input AC voltage, and responsive to a gate pulse generates a modified AC voltage. A rectifier receives the modified AC voltage and generates a rectified DC voltage. A power converter coupled to the rectifier receives the rectified DC voltage and generates a controlled output current. A damping circuit coupled to an output terminal of the rectifier includes a damping resistor for maintaining the holding current in the thyristor during an ON period of the thyristor. The damping circuit includes a first capacitor coupled in series to the damping resistor and a diode coupled in parallel to the damping resistor. The diode enables the first capacitor to discharge without causing power loss at the damping resistor.

12 Claims, 7 Drawing Sheets

THYRISTOR POWER CONTROL CIRCUIT WITH DAMPING CIRCUIT MAINTAINING THYRISTOR HOLDING CURRENT

CROSS-REFERENCE TO RELATED APPLICATIONS

Pursuant to 35 U.S.C. §119 (e), this application claims priority from, and hereby incorporates by reference for all purposes, U.S. Provisional Patent Application Ser. No. 60/927,687, entitled METHOD FOR MAKING A POWER CONVERTER LED DRIVER DIMMABLE WITH A COMMON THYRISTOR DIMMER, and filed May 4, 2007.

FIELD OF THE INVENTION

The invention relates to electronic circuits, and more particularly the invention relates to a thyristor power control circuit.

BACKGROUND OF THE INVENTION

Thyristor dimmer circuits are frequently used to control incandescent lamps, LED lamps and other loads. FIG. 1A illustrates a thyristor dimmer circuit 100. The thyristor dimmer circuit 100 includes a triac-type thyristor 104 connected to an AC voltage source 112. The thyristor 104 is also connected in series to an inductor 120 and to an incandescent lamp 108. A capacitor 124 is connected in parallel to the thyristor 104 and to the inductor 120. A pulse generator circuit 116 applies a periodic gate pulse to the gate terminal 128 of the thyristor 104. In operation, the thyristor 104 turns ON in response to the gate pulse being applied to the gate terminal 128. The thyristor 104 turns OFF at the zero crossing of the AC voltage or when the current flowing through the thyristor 104 drops below a threshold current, known as a holding current.

FIG. 1B illustrates the AC voltage supplied by the voltage source 112, the gate pulse Vgate, and the output voltage Vout across the incandescent lamp 108. The gate pulse Vgate is applied to the gate terminal at a phase angle typically between 30 and 150 degrees. In response, the thyristor 104 turns ON, resulting in the output voltage Vout being applied to the incandescent lamp 108. Due to the switching of the thyristor 104 at a phase angle near 90 degrees, the output voltage Vout transitions rapidly from 0 volt to Vmax at 90 degrees, and again transitions rapidly from 0 volt to Vmin at 270 degrees. As will be understood, the rapid transitions of Vout generates higher order harmonics causing EMI. The inductor 120 and the capacitor 124 act to suppress the EMI. Also, the incandescent lamp 108 provides resistive damping to the EMI and provides the necessary holding current to the thyristor 104.

If the thyristor circuit 104 is used to feed an active load such as a power converter, instead of the incandescent lamp 108, the power converter will not provide the resistive damping or the holding current. FIG. 2 is a power control circuit 200 having a thyristor 204 for controlled power delivery to a power converter 228. A pulse generator circuit 206 applies a periodic gate pulse to a gate terminal 205 of the thyristor 204. An AC voltage source 208 applies an AC voltage to the thyristor 204. The thyristor 204 generates a modified AC output having rapid transitions as illustrated in FIG. 1B. An input filter 232 comprising capacitors 212, 216 and a common mode choke 220 suppresses EMI generated by the power converter 228. A full bridge rectifier 224 comprising diodes D1-D4 rectifies the modified AC voltage to generate a DC voltage at the rectifier output terminal 236. The rectified voltage at the rectifier output terminal 236 is applied to the power converter 228. A capacitor 240 filters the high-frequency pulsed current drawn by the power converter. The power converter 228 may be a switched mode dc-to-dc converter that generates a controlled DC current at the converter output terminal 244. The controlled DC current is filtered by a converter filter capacitor 248 and is applied to an LED bank 252.

As discussed before, the power converter 228 does not provide the resistive damping to the EMI. Also, the power converter 228 does not instantaneously provide the necessary holding current to the thyristor circuit 204. Consequently, ringing current, shown in FIG. 3, generated by the power converter 228 flows through the thyristor circuit 204, causing the current flowing through thyristor 204 to fall below the holding current. Lacking the holding current, the thyristor 204 turns OFF and remains OFF until the next occurrence of the pulse, resulting in erratic performance of the power converter 228 and flickering at the LED load.

SUMMARY

A thyristor power control circuit prevents EMI from leaving a power converter. The power control circuit also maintains a holding current in the thyristor to prevent flickering at a load. The power control circuit includes a thyristor configured to receive an input AC voltage, and responsive to a gate pulse generates a modified AC voltage. A rectifier receives the modified AC voltage and generates a rectified DC voltage. A power converter coupled to the rectifier receives the rectified DC voltage and generates a controlled output current. A damping circuit coupled to an output terminal of the rectifier includes a damping resistor for maintaining a holding current in the thyristor during an ON period of the thyristor. The damping circuit includes a first capacitor coupled in series to the damping resistor and a diode coupled in parallel to the damping resistor. The diode enables the first capacitor to discharge without causing power loss at the damping resistor. The power control circuit further includes an input filter coupled to the thyristor to prevent EMI from leaving the power converter.

BRIEF DESCRIPTION OF THE DRAWINGS

For a more complete understanding of the features, example embodiments and possible advantages of the present invention, reference is now made to the detailed description of the invention along with the accompanying figures and in which.

DETAILED DESCRIPTION OF THE INVENTION

Figure 1A:
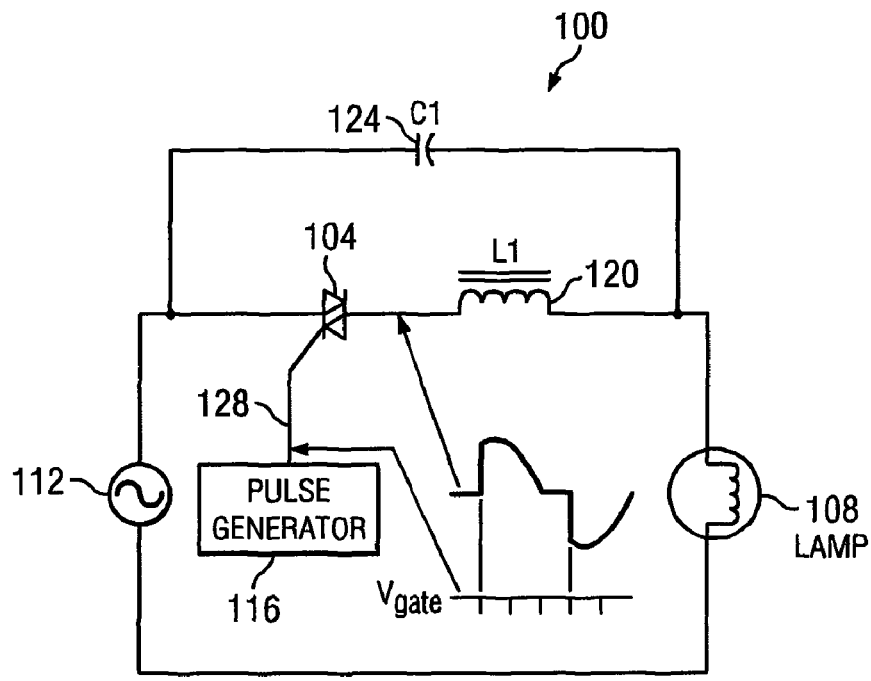
FIG. 1A illustrates a thyristor dimmer circuit.
Figure 1B:
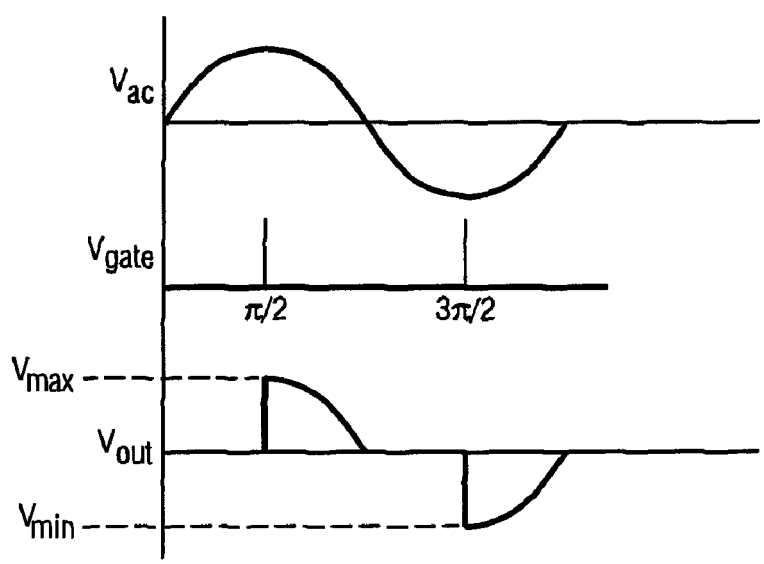
FIG. 1B illustrates voltage waveforms in the thyristor dimmer circuit.
Figure 2:
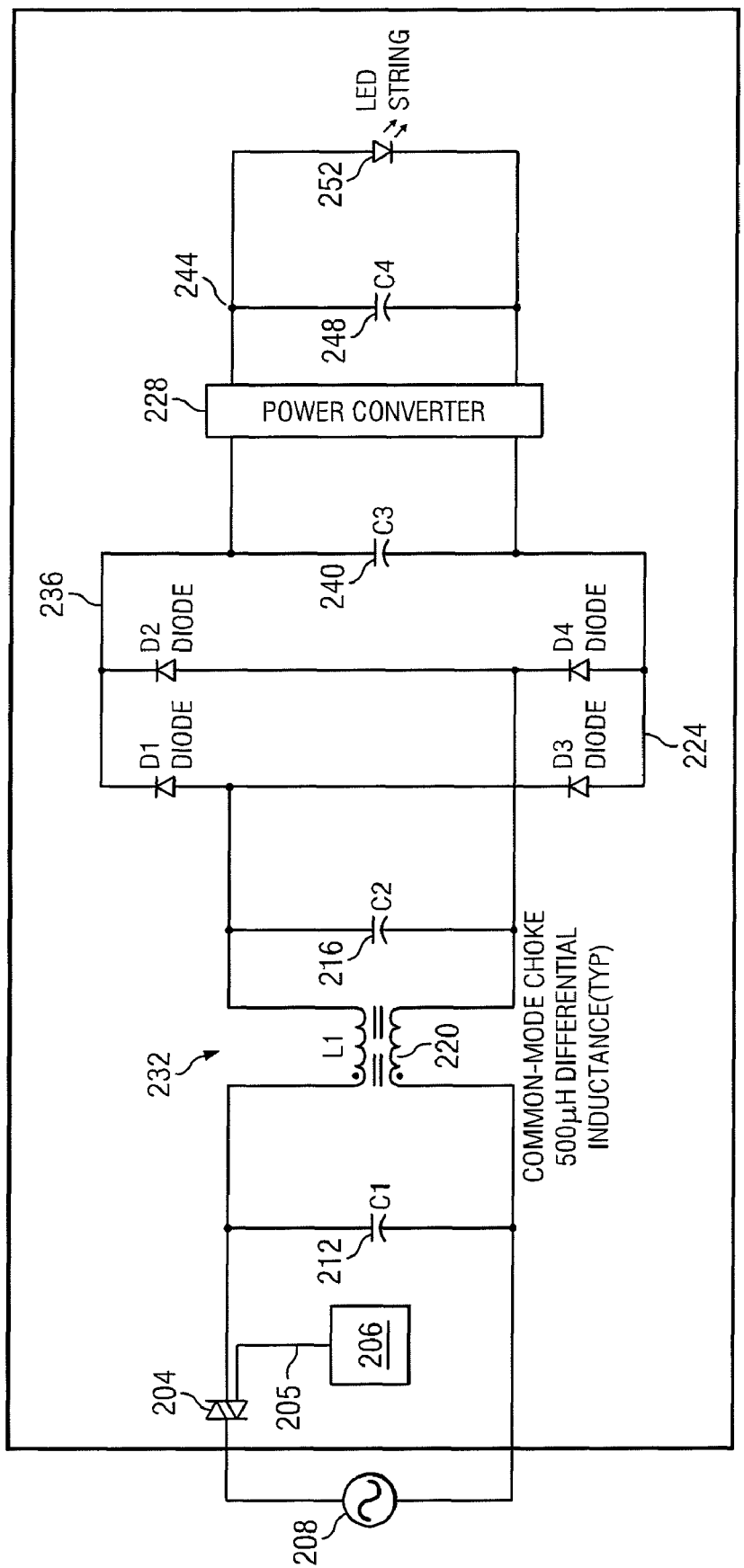
FIG. 2 is a power control circuit for controlled power delivery to a power converter.
Figure 3:
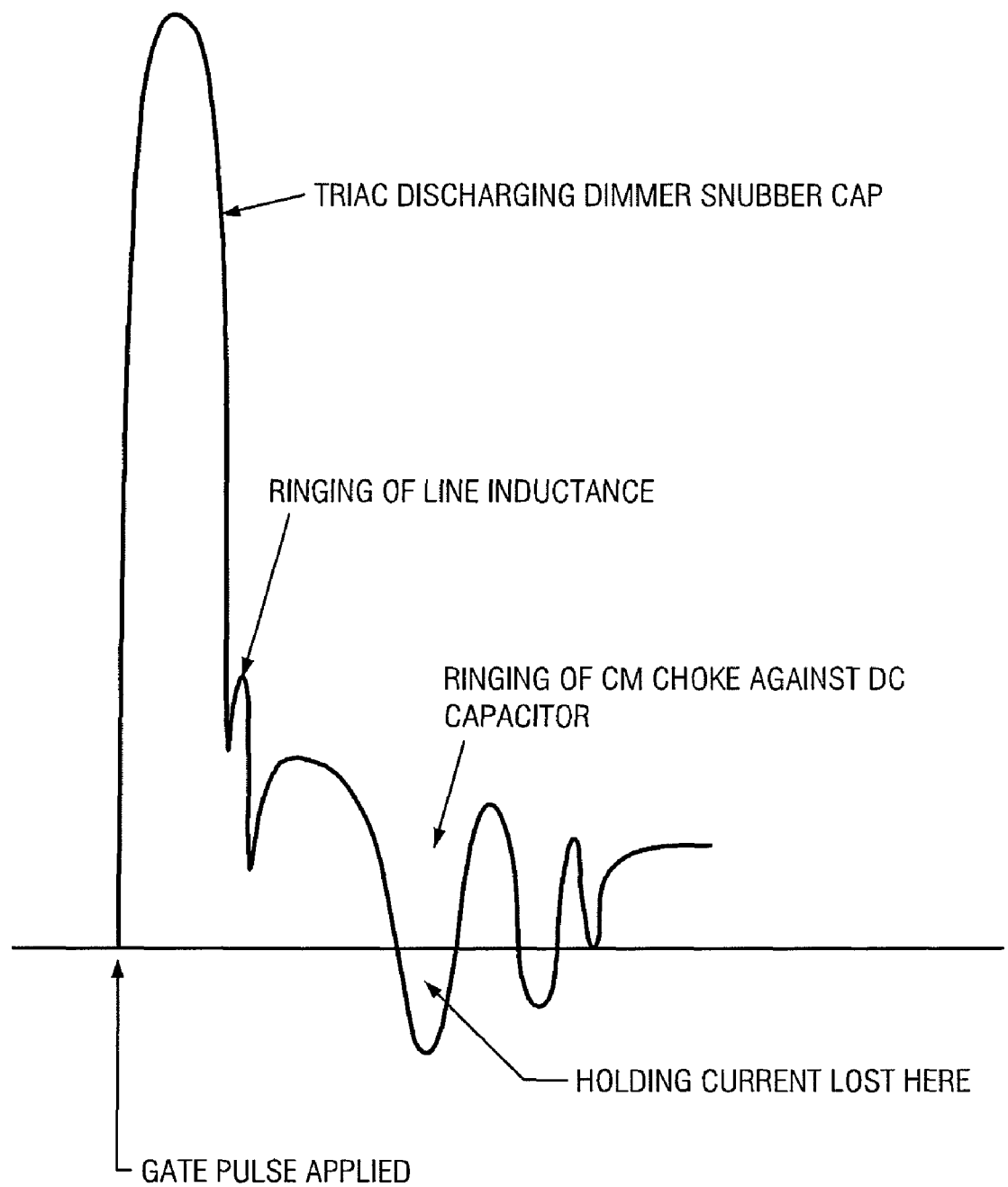
FIG. 3 shows ringing current generated by a power converter.
Figure 4:
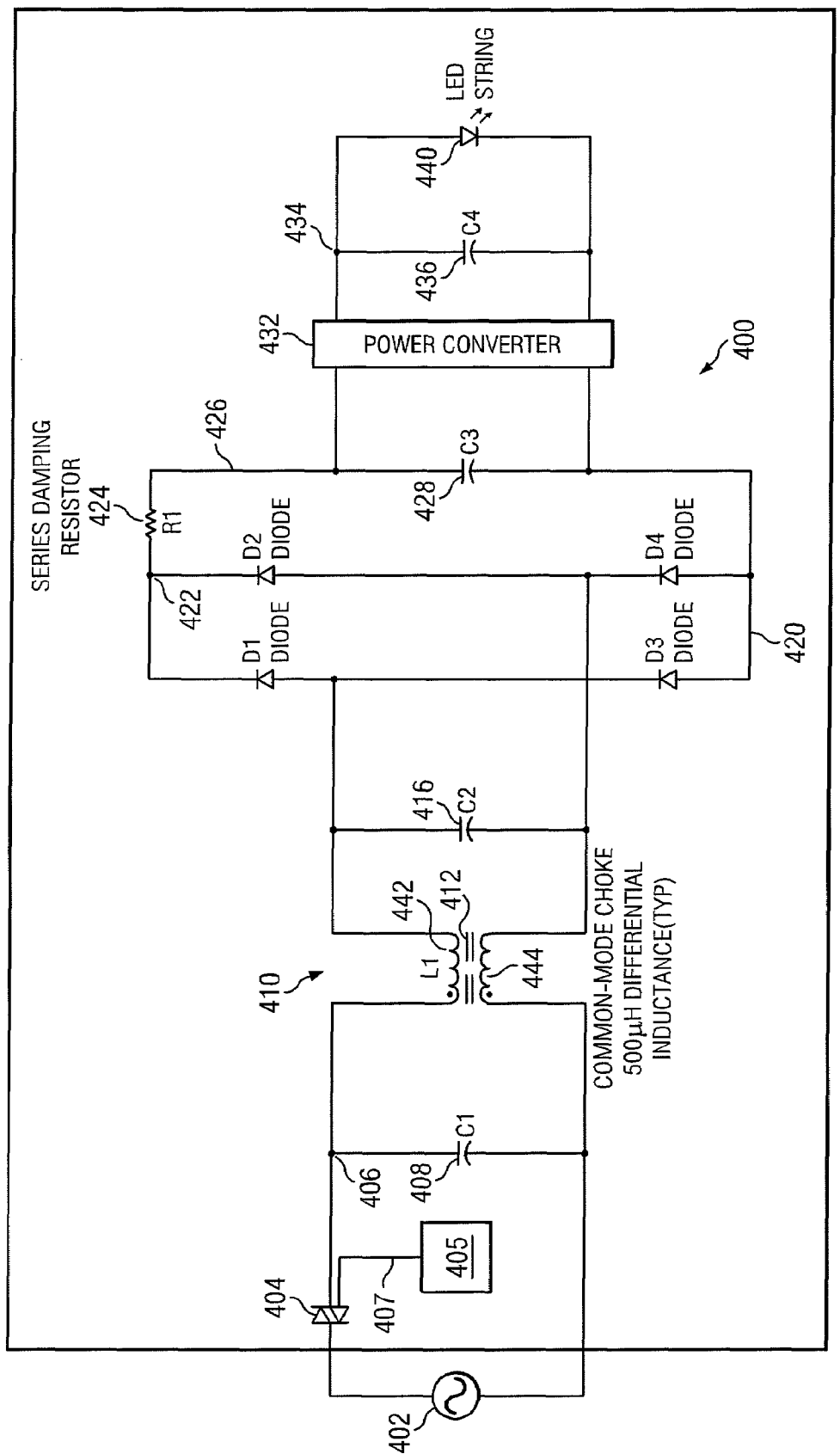
FIG. 4 illustrates a thyristor power control circuit in accordance with an example embodiment.

FIG. 4 illustrates a thyristor power control circuit 400 in accordance with an example embodiment. The circuit 400 includes an AC voltage source 402 connected to a thyristor 404. A pulse generator circuit 405 applies a periodic pulse at a gate terminal 407 of the thyristor 404. Due to a switching action, the thyristor 404 generates a modified AC voltage at a terminal 406. The modified AC voltage is passed through an input filter 410 filter comprising capacitors 408, 416 and a common mode choke 412 having a first and a second winding 442 and 444, respectively. A full bridge rectifier 420 comprising diodes D1-D4 rectifies the modified AC voltage into a DC voltage at the rectifier output terminal 422.

A series damping resistor 424 is connected to the rectifier output terminal 426. The series damping resistor 424 is also connected to a capacitor 428. A high-frequency pulsed current drawn by a power converter circuit 432 is filtered by the capacitor 428. The output of the capacitor 428 is provided to the power converter circuit 432 via a terminal 426. The power converter circuit 432 generates a controlled output current at a terminal 434. The controlled output current is filtered by a power converter filter capacitor 436 and is provided to an LED bank 440.

The series damping resistor 424 suppresses EMI generated by the power converter circuit 432. The series damping resistor 424 also dampens ringing current generated by the input filter 410, thereby maintaining the necessary holding current through the thyristor 404. The series damping resistor 424 also prevents the capacitor 428 from charging too quickly, causing voltage overshoot. Thus, by providing the series damping resistor 424 at the rectifier output terminal 422, the holding current through the thyristor 404 is maintained, thereby preventing flickering at the LED bank 440.

Figure 5:
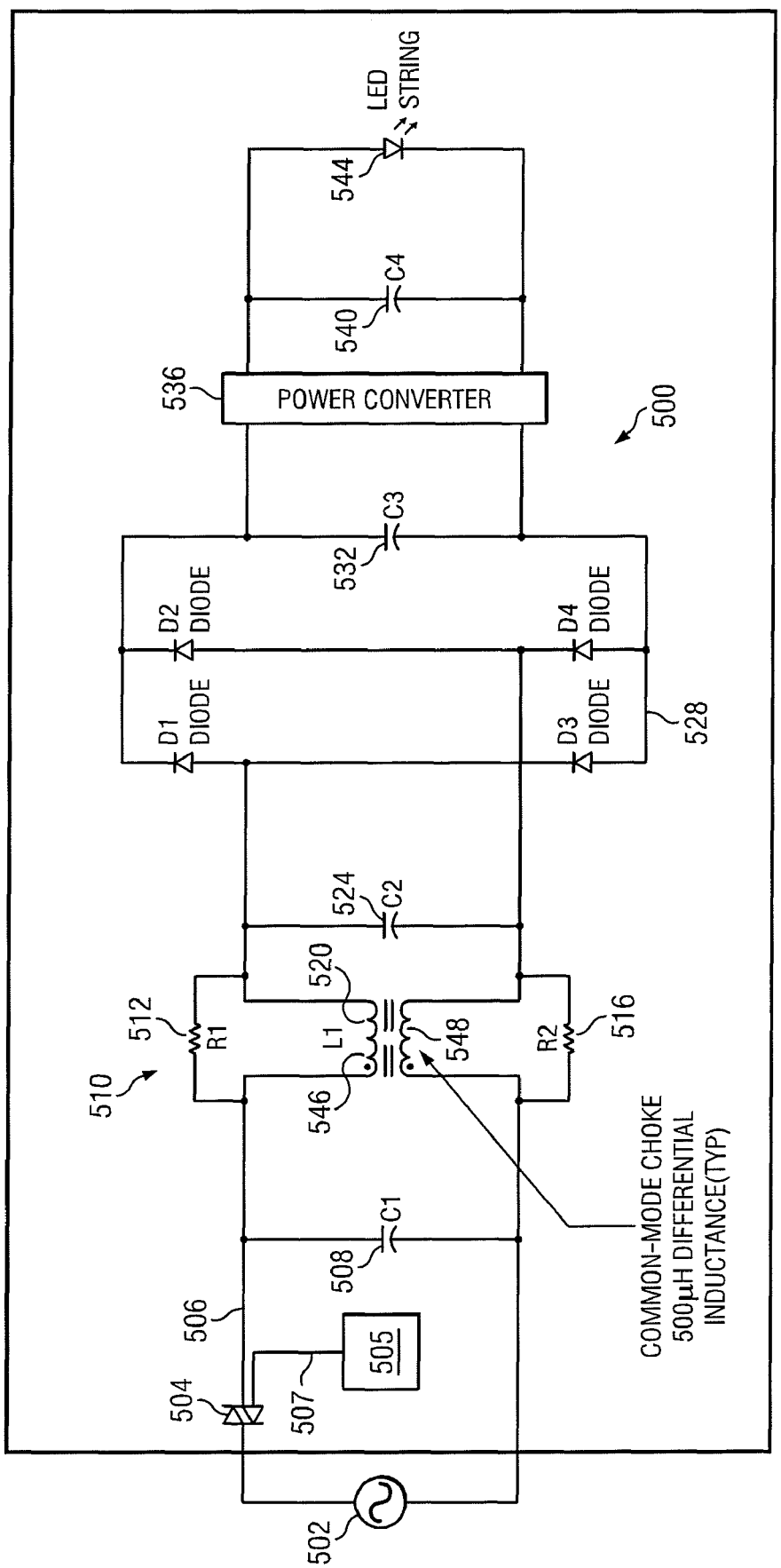
FIG. 5 illustrates a thyristor power control circuit in accordance with another example embodiment.

FIG. 5 illustrates a thyristor power control circuit 500 in accordance with another example embodiment. The circuit 500 includes an AC voltage source 502 connected to a thyristor 504. A pulse generator circuit 505 applies a periodic pulse to a gate terminal 507 of the thyristor 504. By a switching action, the thyristor 504 generates a modified AC voltage at a terminal 506. The modified AC voltage is passed through an input filter 510 filter comprising capacitors 508, 524 and a common mode choke 520 having a first and a second winding 546 and 548, respectively. A damping resistor 512 is connected in parallel with the winding 546, and a damping resistor 516 is connected in parallel with the winding 548. Like the circuit 400 shown in FIG. 4, the circuit 500 includes a full bridge rectifier 528, a power converter input filter capacitor 532, a power converter circuit 536, a power converter output filter capacitor 540 and an LED bank 544.

The damping resistors 512 and 516 damp the ringing current generated by the input filter 510. The damping resistors 512 and 516 also maintain a holding current through the thyristor 504, thus preventing flickering at the LED bank 544.

Figure 6:
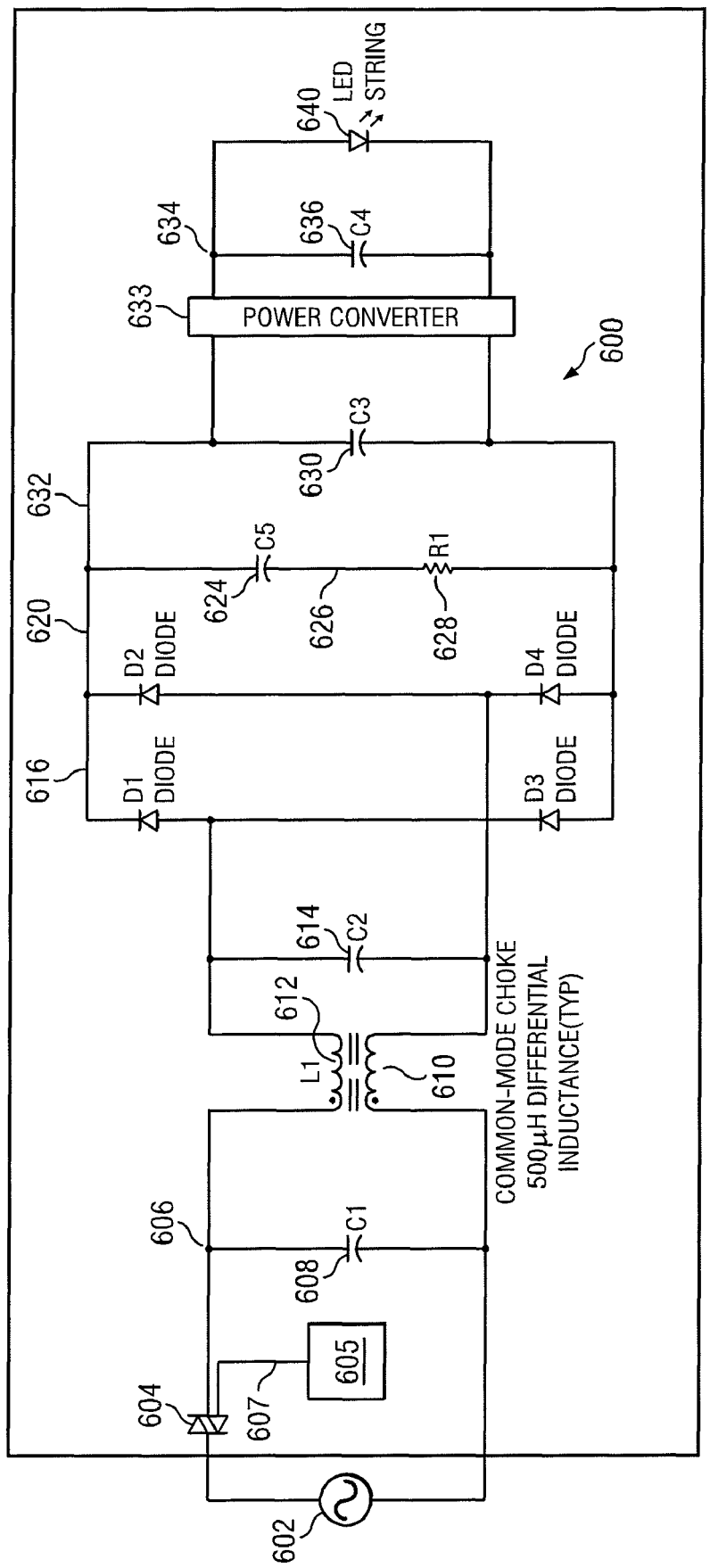
FIG. 6 illustrates a thyristor power control circuit in accordance with yet another example embodiment.

FIG. 6 illustrates a thyristor power control circuit 600 in accordance with yet another example embodiment. The circuit 600 includes an AC voltage source 602 connected to a thyristor 604. The thyristor 604 receives a periodic gate pulse from a pulse generator circuit 605 at a gate terminal 607. The thyristor 604 generates a modified AC voltage by a switching action at a terminal 606. The modified AC voltage is passed through an input filter 610 comprising capacitors 608, 614 and a common mode choke 612 having a first and a second winding. A full bridge rectifier 616 comprising diodes D1-D4 rectifies the modified AC output, which is filtered by a power converter input filter capacitor 630. The output of the rectifier filter capacitor 630 is provided to a power converter circuit 633 via a terminal 632. The power converter circuit 633 generates a controlled output current at a terminal 634, which is filtered by a converter output capacitor 636. The output of the converter output capacitor 636 is provided to a LED bank 640.

An R-C network 626, formed by a resistor 628 connected in series with a capacitor 624, is connected in parallel to the rectifier output terminal 620. The R-C network 626 eliminates ringing current and maintains the necessary holding current flowing in the thyristor 604. By maintaining the holding current, flickering of the LED bank 640 is prevented.

Figure 7:
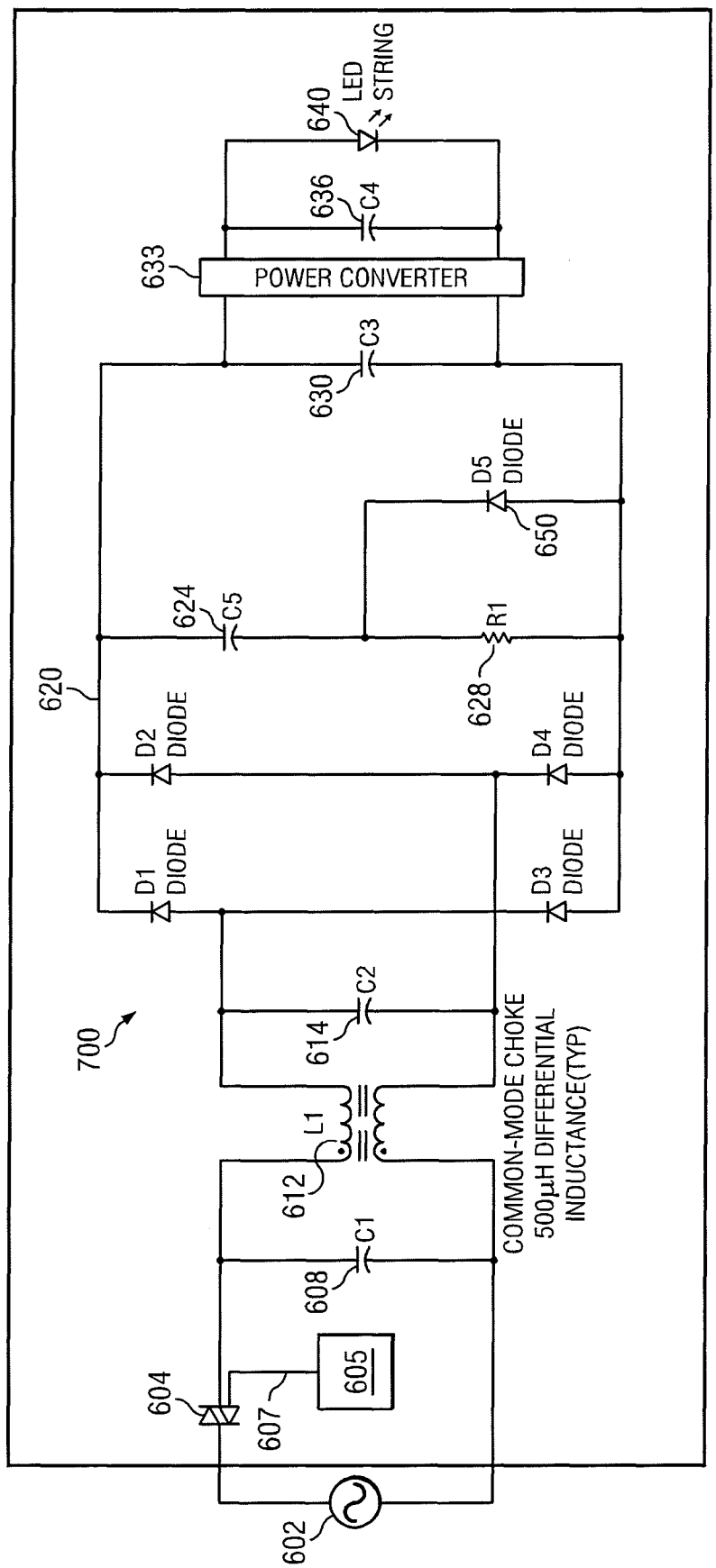
FIG. 7 a thyristor power control circuit in accordance with yet another example embodiment.

FIG. 7 shows a thyristor power control circuit 700 in accordance with yet another example embodiment. As shown in FIG. 7, the circuit 700 is similar in many respects to the circuit 600 shown in FIG. 6 except that a diode 650 is connected in parallel to the resistor 628. The diode 650 improves efficiency of the circuit 700 by eliminating power dissipation by the resistor 628 during the discharge period of the capacitor 624. As will be appreciated, although the resistor 628 provides the necessary holding current to the thyristor 604 to prevent turn OFF by the ringing current and thus prevents flickering at the load, i.e., LED lamp 640, the resistor 628 dissipates power during the discharge period of the capacitor 624. The diode 650 enables the capacitor 624 to discharge without causing power loss at the resistor 628.

In one example embodiment, the thyristor power control circuits illustrated in FIGS. 5, 6, and 7 may be implemented in a semiconductor integrated circuit. In another embodiment, various components of the thyristor power control circuits of FIGS. 5-7 may be implemented in a semiconductor integrated circuit. By way of an example, the damping circuit and the power converter circuit illustrated in FIGS. 6 and 7 may be implemented in a semiconductor integrated circuit. The power converter circuit may be any one of known switched-mode converter.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A thyristor power control circuit, comprising:
   a thyristor operable to receive an input AC voltage, the thyristor responsive to a gate pulse generating a modified AC voltage;
   a rectifier operable to receive the modified AC voltage and generate a rectified DC voltage;
   a power converter operable to receive the rectified DC voltage and generate a controlled output current; and
   a damping circuit coupled to an output of the rectifier, the damping circuit having a damping resistor operable to maintain a holding current in the thryristor during an ON period of the thyristor,
   wherein the damping circuit is an R-C network comprising a first capacitor coupled to the damping resistor, the R-C network configured to reduce a ringing current flowing through the thryristor.

2. The circuit of claim 1, wherein the damping circuit further comprises a diode coupled in parallel to the damping resistor, the diode configured to enable the first capacitor to discharge without power loss at the damping resistor.

3. A thyristor power control circuit, comprising:
   a thyristor operable to receive an input AC voltage, the thyristor responsive to a gate pulse generating a modified AC voltage;
   a rectifier operable to receive the modified AC voltage and generate a rectified DC voltage between a first output node and a second output node;
   a power converter operable to receive the rectified DC voltage and generate a controlled output current, the power converter having a first input node and a second input node; and
   a damping circuit coupled between the first and second output nodes and the first and second input nodes, the damping circuit having a damping resistor operable to maintain a holding current in the thyristor during an ON period of the thyristor, wherein the resistor is directly connected between the first output node and the first input node, and further including a direct connection between the second output node and the second input node, and still further including a capacitor directly connected between the first input node and second input node.

4. The circuit of claim 3, further comprising an input filter coupled to the thyristor, the input filter configured to prevent electromagnetic interference (EMI) from leaving the power converter.

5. The circuit of claim 3, further comprising a resistive load coupled to an output terminal of the power converter, the resistive load receiving the controlled output current from the power converter.

6. A thyristor power control circuit, comprising:
   a thyristor operable to receive an input AC voltage, the thyristor responsive to a gate pulse generating a modified AC voltage;
   a rectifier operable to receive the modified AC voltage and generate a rectified DC voltage;
   a power converter operable to receive the rectified DC voltage and generate a controlled output current;
   an input filter coupled to the thyristor, the input filter having a common mode choke with first and second windings, the input filter configured to prevent electromagnetic interference (EMI) from leaving the power converter; and
   a first damping resistor coupled in parallel to the first winding and a second damping resistor coupled in parallel to the second winding, the first and second damping resistors being configured to maintain holding current in the thyristor.

7. The circuit of claim 6, wherein the input filter further comprises at least one input capacitor coupled to the common mode choke.

8. The circuit of claim 6, further comprising an output capacitor configured to filter the rectified DC output voltage.

9. The circuit of claim 6, further comprising a resistive load coupled to an output terminal of the power converter, the resistive load receiving the controlled output current from the power converter.

10. A thyristor power control circuit, comprising:
    a thyristor operable to receive an input AC voltage, the thyristor responsive to a gate pulse generating a modified AC voltage;
    a rectifier operable to receive the modified AC voltage and generate a rectified DC voltage;
    a power converter operable to receive the rectified DC voltage and generate a controlled output current; and
    a damping circuit coupled to an output of the rectifier, the damping circuit having a damping resistor and a first capacitor connected in series, the damping circuit having a diode connected in parallel to the damping resistor to enable the first capacitor to discharge without power loss at the damping resistor, the damping circuit configured to maintain a holding current in the thryristor during an ON period of the thyristor.

11. The circuit of claim 10, further comprising an input filter coupled to the thyristor, the input filter configured to prevent electromagnetic interference (EMI) from leaving the power converter.

12. The circuit of claim 10, further comprising a resistive load coupled to an output terminal of the power converter, the resistive load receiving the controlled output current from the power converter.

* * * * *

UNITED STATES PATENT AND TRADEMARK OFFICE
CERTIFICATE OF CORRECTION

| | | |
|---|---|---|
| PATENT NO. | : 7,978,485 B2 | Page 1 of 1 |
| APPLICATION NO. | : 12/114618 | |
| DATED | : July 12, 2011 | |
| INVENTOR(S) | : Thomas Stamm et al. | |

It is certified that error appears in the above-identified patent and that said Letters Patent is hereby corrected as shown below:

At column 5, claim number 1, line number 20, please replace the word [thryristor] with the word -- thyristor --.

At column 5, claim number 1, line number 25, please replace the word [thryristor] with the word -- thyristor --.

At column 6, claim number 10, line number 45, please replace the word [thryristor] with the word -- thyristor --.

Signed and Sealed this
Thirtieth Day of August, 2011

David J. Kappos
*Director of the United States Patent and Trademark Office*